United States Patent
Liu et al.

(10) Patent No.: US 11,320,290 B2
(45) Date of Patent: *May 3, 2022

(54) ROTATION PARAMETER DETECTION METHOD, ENCODER, LASER RADAR AND UNMANNED AERIAL VEHICLE

(71) Applicant: SZ DJI TECHNOLOGY CO., LTD., Shenzhen (CN)

(72) Inventors: Wanqi Liu, Shenzhen (CN); Qiu Lan, Shenzhen (CN); Changxing Zhou, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/110,239

(22) Filed: Dec. 2, 2020

(65) Prior Publication Data

US 2021/0108947 A1 Apr. 15, 2021

Related U.S. Application Data

(63) Continuation of application No. 16/742,171, filed on Jan. 14, 2020, now Pat. No. 10,859,409, which is a (Continued)

(51) Int. Cl.
 *G01D 5/347* (2006.01)
 *G01P 3/38* (2006.01)
 *G01P 13/04* (2006.01)

(52) U.S. Cl.
 CPC .............. *G01D 5/3473* (2013.01); *G01P 3/38* (2013.01); *G01P 13/045* (2013.01)

(58) Field of Classification Search
 CPC ...... G01D 5/3473; G01D 5/347; G01D 5/342; G01D 5/34; G01D 5/34707;
 (Continued)

(56) References Cited

U.S. PATENT DOCUMENTS 6,313,625 B1  11/2001  Varady et al.
6,727,686 B2  4/2004  Beckmann et al.
(Continued)

FOREIGN PATENT DOCUMENTS

CN  2097269 U  2/1992
CN  200996835 Y  12/2007
(Continued)

OTHER PUBLICATIONS

The World Intellectual Property Organization (WIPO) International Search Report for PCT/CN2017/115537 dated Aug. 1, 2018 5 Pages.

*Primary Examiner* — John R Lee
(74) *Attorney, Agent, or Firm* — Anova Law Group, PLLC

(57) ABSTRACT

An encoder includes a code disc and a processor communicatively coupled with the code disc. The code disc is configured to rotate along with a rotating object and includes a plurality of fan teeth extending radially. One of the plurality of fan teeth is different from other ones of the plurality of fan teeth, and the other ones of the fan teeth are same to each other. A first portion of a detection signal that is generated in one rotation of the code disc, corresponding to the one of the plurality of fan teeth, is different from a second portion of the detection signal, corresponding to each of the other ones of the fan teeth. The processor is configured to detect the rotation of the code disc to obtain the detection signal and a rotation parameter of the rotating object based on the detection signal.

20 Claims, 6 Drawing Sheets

Related U.S. Application Data continuation of application No. PCT/CN2017/115537, filed on Dec. 12, 2017.

(58) Field of Classification Search
CPC ...... G01D 5/34715; G01D 5/14; G01D 5/142; G01D 5/145; G01D 5/56; G01D 5/58; G01D 5/12; G01P 3/38; G01P 13/04; G01P 13/045

See application file for complete search history.

(56) References Cited

U.S. PATENT DOCUMENTS

| | | | |
|---|---|---|---|
| 7,541,802 B2 | 6/2009 | Hainz et al. | |
| 8,250,910 B2 | 8/2012 | Rolew et al. | |
| 8,656,762 B2 | 2/2014 | Hoetzel | |
| 10,859,409 B2* | 12/2020 | Liu | G01P 13/045 |
| 2006/0000969 A1 | 1/2006 | Sano | |
| 2006/0201238 A1 | 9/2006 | Trapasso | |
| 2008/0087249 A1 | 4/2008 | Namari et al. | |
| 2009/0312959 A1 | 12/2009 | Borman | |
| 2014/0009043 A1 | 1/2014 | Watanabe | |
| 2015/0137800 A1 | 5/2015 | Hainz et al. | |
| 2015/0362335 A1 | 12/2015 | Spitzer et al. | |
| 2017/0315146 A1 | 11/2017 | Koeck et al. | |
| 2020/0149930 A1* | 5/2020 | Liu | G01D 5/3473 |
| 2021/0108947 A1* | 4/2021 | Liu | G01P 3/38 |

FOREIGN PATENT DOCUMENTS

| | | |
|---|---|---|
| CN | 101929874 A | 12/2010 |
| CN | 201672931 U | 12/2010 |
| CN | 202281780 U | 6/2012 |
| CN | 102704756 A | 10/2012 |
| CN | 104655161 A | 5/2015 |
| CN | 104965099 A | 10/2015 |
| CN | 105675029 A | 6/2016 |
| DE | 10017542 A1 | 10/2001 |
| EP | 0813050 A2 | 12/1997 |
| EP | 1046775 A2 | 10/2000 |
| JP | S6358168 A | 3/1988 |
| JP | H05288568 A | 11/1993 |

* cited by examiner

ROTATION PARAMETER DETECTION METHOD, ENCODER, LASER RADAR AND UNMANNED AERIAL VEHICLE

CROSS-REFERENCE TO RELATED APPLICATIONS

This application is a continuation of application Ser. No. 16/742,171, filed on Jan. 14, 2020, which is a continuation of International Application No. PCT/CN2017/115537, filed on Dec. 12, 2017, the entire contents of both of which is incorporated herein by reference.

TECHNICAL FIELD

The present disclosure relates to the technical field of encoders and, more particularly, to a rotation parameter detection method, an encoder, a laser radar, and an unmanned aerial vehicle.

BACKGROUND

An electric motor is an important component of an unmanned aerial vehicle (UAV). Taking the UAV being an unmanned aircraft as an example, the electric motor drives a propeller on the unmanned aircraft to rotate to fly the unmanned aircraft. A rotation direction of the electric motor affects a flying direction of the unmanned aircraft and a rotation speed of the electric motor affects a flying speed of the unmanned aircraft. To precisely control flight of the unmanned aircraft, rotation parameters of the electric motor, such as the rotation speed, the rotation direction, and a rotation time, need to be detected. Currently, ABZ signals are used to detect the rotation parameters. Specifically, the rotation speed and the rotation direction of the electric motor are recognized based on an A signal and a B signal, a mechanical zero position is recognized based on a Z signal. However, the A signal, the B signal, and the Z signal are obtained by three sensors, respectively. The three sensors are controlled by three hardware switches, respectively. Each hardware switch has a corresponding failure rate. As long as one of the three hardware switches fails, it is unable to obtain the rotation parameters. Thus, using the ABZ signals to detect the rotation parameters has a high failure rate and correspondingly, the cost is high.

SUMMARY

In accordance with the disclosure, there is provided an encoder including a code disc and a processor communicatively coupled with the code disc. The code disc is configured to rotate along with a rotating object and includes a plurality of fan teeth extending radially. Each of the fan teeth includes a first line segment edge, a second line segment edge, and an arc edge along a circumference of the code disc and connecting the first line segment edge and the second line segment edge. The first line segment edges of the fan teeth are arranged at the code disc with equal intervals. A length of the arc edge of one of the fan teeth is different from lengths of the arc edges of other ones of the fan teeth, and the lengths of the arc edges of the other ones of the fan teeth equal each other. The processor is configured to detect a rotation of the code disc to obtain a detection signal, and obtain a rotation parameter of the rotating object based on the detection signal. The rotation parameter includes at least one of a rotation direction, a rotation speed, or a mechanical zero position.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

To make the objectives, technical solutions, and advantages of the embodiments of the present disclosure clearer, technical solutions of the present disclosure will be clearly and completely described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

The embodiments of the present disclosure provide a rotation parameter detection method, an encoder, a laser radar, and an unmanned aerial vehicle (UAV). The UAV may be, but is not limited to, a rotorcraft, for example, a multi-rotor aircraft propelled by a plurality of air propulsion devices.

Figure 1:
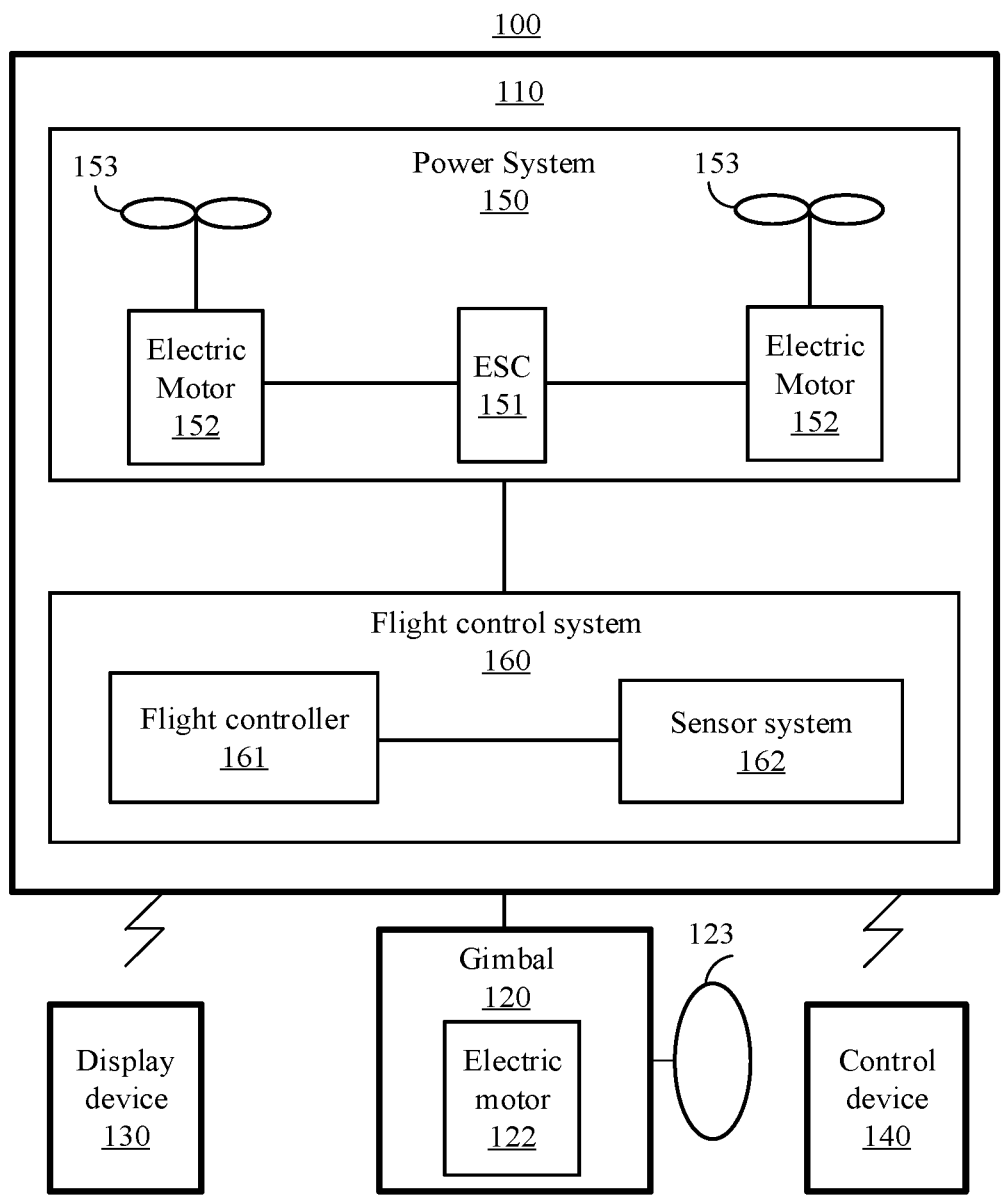
FIG. 1 is a schematic architecture diagram of an unmanned flight system 100 according to an example embodiment of the present disclosure.

FIG. 1 is a schematic architecture diagram of an unmanned flight system 100 according to an example embodiment of the present disclosure. In the embodiments of the present disclosure, a rotor-propelled UAV is described for illustrative purposes.

The unmanned flight system 100 includes a UAV 110, a gimbal 120, a display device 130, and a control device 140. The UAV 110 includes a power system 150, a flight control system 160, and a frame. The UAV 110 may wirelessly communicate with the control device 140 and the display device 130.

The frame may include a body and a stand (also called a landing gear). The body may include a center frame and one or more arms connected with the center frame. The one or more arms extend radially from the center frame. The stand is connected to the body and is configured to support the UAV 110 during landing.

The power system 150 includes one or more electronic speed controls (referred to as ESC) 151, one or more propellers 153, and one or more electric motors 152 corresponding to the one or more propellers 153. The electric motor 152 connects between the ESC 151 and the propeller 153. The electric motor 152 and the propeller 153 are disposed at the arm of the UAV 110. The ESC 151 is configured to receive a driving signal generated by the flight control system 160 and to supply a driving current to the electric motor 152 according to the driving signal to control a rotation speed of the electric motor 152. The electric motor 152 is configured to drive the propeller 153 to rotate to supply power for the flight of the UAV 110. The power enables the UAV 110 to move in one or more degrees of freedom. In some embodiments, the UAV 110 may rotate around one or more rotation axes. For example, the rotation axes may include a roll axis, a yaw axis, and a pitch axis. It should be understood that the electric motor 152 may be a direct current (DC) electric motor or an alternate current (AC) electric motor. In addition, the electric motor 152 may be a brushless motor or a brushed motor.

The flight control system 160 includes a flight controller 161 and a sensor system 162. The sensor system 162 is configured to measure attitude information of the UAV 110, that is, spatial position and state information of the UAV 110, such as three-dimensional position, three-dimensional angle, three-dimensional velocity, three-dimensional acceleration, and three-dimensional angular velocity. The sensor system 162 may include, for example, at least one of a gyroscope, an ultrasonic sensor, an electronic compass, an inertial measurement unit (IMU), a visual sensor, a global navigation satellite system, or a barometer. For example, the global navigation satellite system may be the global positioning system (GPS). The flight controller 161 is configured to control the flight of the UAV 110, for example, to control the flight of the UAV 110 according to the attitude information measured by the sensor system 162. It should be understood that the flight controller 161 may control the UAV 110 according to pre-programmed program instructions or may control the UAV 110 in response to one or more control instructions from the control device 140.

The gimbal 120 includes an electric motor 122. The gimbal 120 is configured to hold a photographing device 123. The flight controller 161 may control movement of the gimbal 120 through the electric motor 122. In one embodiment, the gimbal 120 may also include a controller configured to control the electric motor 122 to control the movement of the gimbal 120. It should be understood that the electric motor 122 may be independent of the UAV 110 or may be part of the UAV 110. It should be understood that the electric motor 122 may be a DC electric motor or an AC electric motor. In addition, the electric motor 122 may a brushless electric motor or a brushed electric motor. It should be understood that the gimbal 120 may be disposed at the top of the UAV 110 or at the bottom of the UAV 110.

The photographing device 123 may be, for example, a device for capturing images, such as a camera or camcorder. The photographing device 123 may communicate with the flight controller 161 and may capture images under the control of the flight controller 161. In one embodiment, the photographing device 123 includes at least a photosensitive element, such as a complementary metal oxide semiconductor (CMOS) sensor or a charge-coupled device (CCD) sensor.

Disposed at a ground terminal of the unmanned flight system 100, the display device 130 may communicate with the UAV 110 wirelessly and may be configured to display the attitude information of the UAV 110. In addition, the display device 130 may also display images photographed by the photographing device 123. It should be understood that the display device 130 may be an independent device or may be integrated in the control device 140.

Disposed at the ground terminal of the unmanned flight system 100, the control device 140 may communicate with the UAV 110 wirelessly and may be configured to remotely control the UAV 110.

It should be understood that the foregoing naming of various components of the unmanned flight system 100 is merely for identification purpose, and should not be construed as limiting the embodiments of the present disclosure.

In the embodiments of the present disclosure, a rotating object may be the electric motor 152 in FIG. 1.

Figure 2:
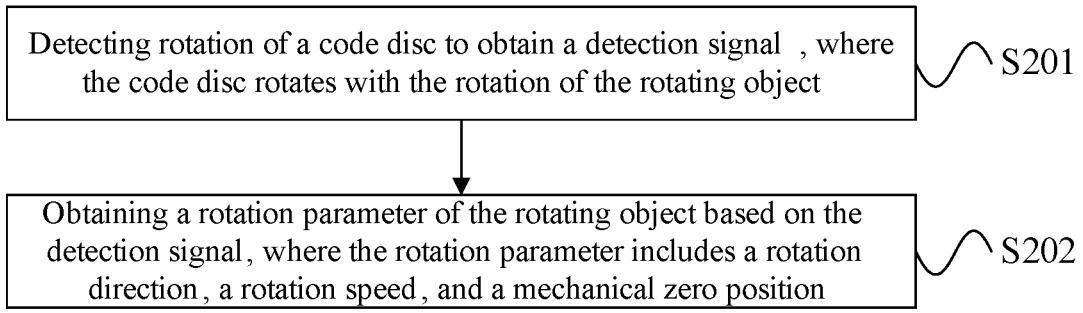
FIG. 2 is a flowchart of a rotation parameter detection method according to an example embodiment of the present disclosure.

FIG. 2 is a flowchart of a rotation parameter detection method according to an example embodiment of the present disclosure. As shown in FIG. 2, the method includes the following.

At S201, rotation of a code disc is detected to obtain a detection signal. The code disc rotates with the rotation of the rotating object.

At S202, a rotation parameter of the rotating object is obtained based on the detection signal. The rotation parameter includes a rotation direction, a rotation speed, a mechanical zero position.

In some embodiments, the obtained rotation parameter includes the rotation direction, the rotation speed, and the mechanical zero position. The rotation parameter of the rotating object during the rotation may be detected by an encoder. Thus, the method according to the embodiments of the present disclosure may be implemented by the encoder. The code disc of the encoder rotates with the rotation of the rotating object.

In some embodiments, N fan teeth are disposed at the code disc extending radially, where N is an integer greater than 2. Each fan tooth includes a first line segment edge and a second line segment edge. The first line segment edges of the N fan teeth are disposed at the code disc at equal intervals. Each fan tooth includes an arc edge along a circumference of the code disc. One of the N fan teeth has the arc edge of a different length. The remaining fan teeth have the arc edges of a same length.

Figure 3:
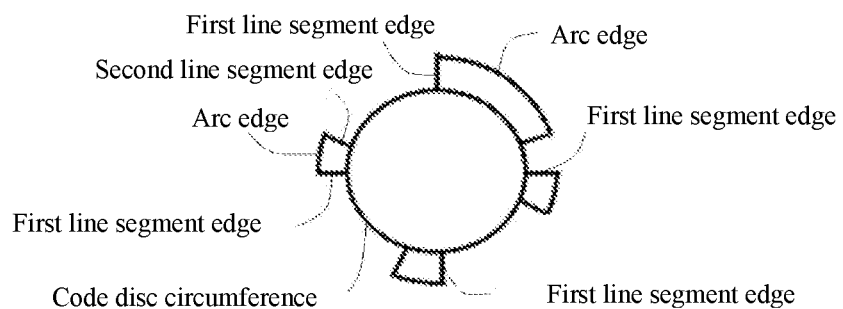
FIG. 3 is a schematic diagram of a code disc according to an example embodiment of the present disclosure.

FIG. 3 is a schematic diagram of a code disc according to an example embodiment of the present disclosure. As shown in FIG. 3, the code disc includes four fan teeth. The first line segment edges of the four fan teeth are arranged at the code disc with equal intervals. Each fan tooth has the second line segment edge disposed opposite to the first line segment edge. One of the four fan teeth is different from the remaining three fan teeth, and has the arc edge length different from that of the remaining three fan teeth. As shown in FIG. 3, one fan tooth has the arc edge length longer than the arc edge lengths of the remaining three fan teeth, and the remaining three fan teeth have the same arc edge lengths. It should be noted that the number of the fan teeth of the code disc is not limited to the number of the fan teeth shown in FIG. 3. In some embodiments, the fan tooth having the different arc edge length may have the arc edge length shorter than the arc edge lengths of the remaining fan teeth.

Because the code disc is driven by the rotating object to rotate, the rotation of the code disc reflects the rotation of the rotating object. The rotation of the code disc generates the detection signal. The rotation direction, the rotation speed, and the mechanical zero position of the rotating object may be obtained based on the detection signal generated during the rotation of the code disc. Because one of the fan teeth of the code disc is different from other fan teeth, one of the detection signals generated in one complete rotation of the code disc is different. As such, in one embodiment, the rotation parameter may be obtained through one different detection signal. Compared with the existing technology that needs three detection signals, the number of the detection signals is reduced, the number of supporting hardware is reduced correspondingly, the failure rate is reduced, and the cost is reduced.

Figure 4:
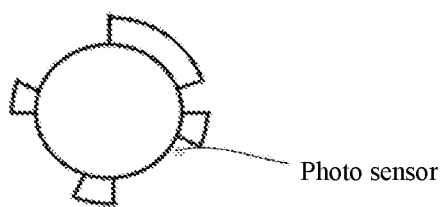
FIG. 4 is a schematic diagram of the code disc and an optoelectrical sensor according to an example embodiment of the present disclosure.

In some embodiments, a photo sensor is disposed adjacent to the code disc. As shown in FIG. 4, when any of the fan teeth of the code disc blocks the photo sensor, the detection signal is a continuous first signal. When none of the fan teeth of the code disc blocks the photo sensor, the detection signal is a continuous second signal. The first signal is different from the second signal. Thus, when the fan tooth that is different from the other fan teeth blocks the photo sensor, the resulted detection signal is the continuous first signal and a duration of the continuous first signal is longer than the duration of the continuous first signal resulted from being blocked by each of the other fan teeth.

In some embodiments, the first signal is a low-level signal and the second signal is a high-level signal. For example, the low-level signal is a 0-level signal and the high-level signal is a 1-level signal.

In some embodiments, the detection signal is a sine wave signal, a cosine wave signal, or a triangle wave signal.

In some embodiments, the detection signal is a square wave signal.

Figure 5:
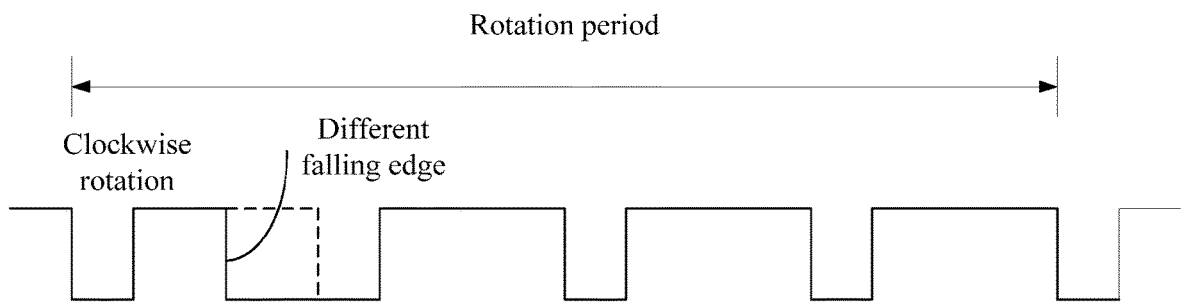
FIG. 5 is a schematic waveform diagram of a detection signal of a clockwise rotating code disc according to an example embodiment of the present disclosure.

Referring to FIG. 4 and FIG. 5, if the rotating object rotates clockwise, the code disc also rotates clockwise. The code disc rotates one complete round, that is, one rotation period. Because one fan tooth is different from the other fan teeth, when the different fan tooth blocks the photo sensor, the detection signal is the continuous low-level signal having the longest duration, which is preceded by a high-level signal. Because the duration of this low-level signal is the longest, the duration of the preceding high-level signal is the shortest. Compared with the other fan teeth, the preceding high-level signal transitions to the low-level signal ahead of time.

Figure 6:
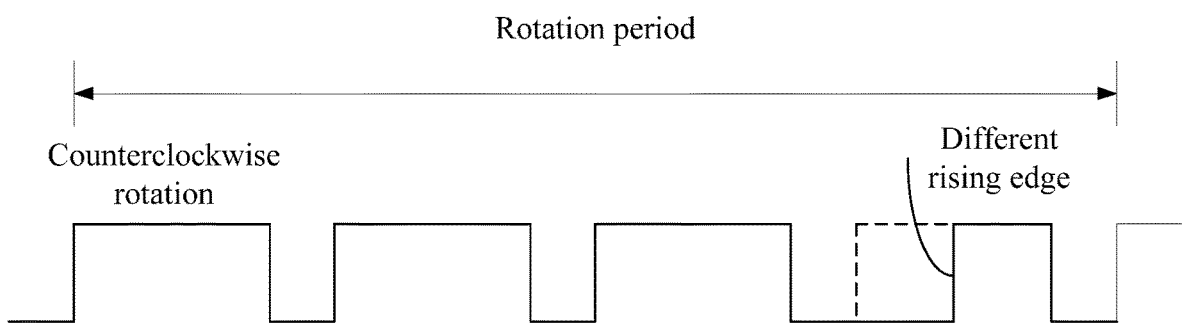
FIG. 6 is a schematic waveform diagram of a detection signal of a counterclockwise rotating code disc according to an example embodiment of the present disclosure.

Referring to FIG. 4 and FIG. 6, if the rotating object rotates counterclockwise, the code disc also rotates counterclockwise. The code disc rotates one complete round, that is, one rotation period. Because one fan tooth is different from the other fan teeth, when the different fan tooth blocks the photo sensor, the detection signal is the continuous low-level signal having the longest duration, which is followed by a high-level signal. Because the duration of this low-level signal is the longest, the duration of the succeeding high-level signal is the shortest. Compared with the other fan teeth, this low-level signal transitions to the high-level signal behind in time.

Based on the waveform of the detection signal in the rotation period in FIG. 5 or FIG. 6, the rotation parameter of the rotating object may be detected.

The following describes how to obtain the rotation direction in the rotation parameter.

In some embodiments, during the rotation period of the rotating object, the rotation direction is determined based on a rising edge and/or a falling edge of the detection signal. For example, as shown in FIG. 5 and FIG. 6, the rising edge of the detection signal generated when the rotating object rotates clockwise is different from the rising edge of the detection signal generated when the rotating object rotates counterclockwise. Similarly, the falling edge of the detection signal generated when the rotating object rotates clockwise is different from the falling edge of the detection signal generated when the rotating object rotates counterclockwise. Thus, the rotation direction may be determined based on the rising edges and/or the falling edges of the detection signal in the rotation period.

In one embodiment, in the rotation period of the rotating object, the rotation direction is determined based on time relationship between the rising edges in the detection signal and/or time relationship between the falling edges in the detection signal. For example, as shown in FIG. 5 and FIG. 6, the rising edges in the detection signal detected during the clockwise rotation are different in time from the rising edges in the detection signal detected during the counterclockwise rotation, and the falling edges in the detection signal detected during the clockwise rotation are different in time from the falling edges in the detection signal detected during the counterclockwise rotation. Thus, the rotation direction may be determined based on the time relationship between the rising edges in the detection signal detected in the rotation period and/or the time relationship between the falling edges in the detection signal detected in the rotation period.

If the first line segment edge is disposed in the counterclockwise direction of the fan tooth, for example, as shown in FIG. 4, and the detection signal is detected during the clockwise rotation, as shown in FIG. 5, any two adjacent rising edges in the detection signal are equally separated in time in the rotation period, and any two adjacent falling edges in the detection signal are not always equally separated in time in the rotation period. As shown in FIG. 5, the time difference between the first falling edge and the second falling edge is smaller than the time difference between the second falling edge and the third falling edge. When the detection signal is detected during the counterclockwise rotation, as shown in FIG. 6, any two adjacent falling edges in the detection signal are equally separated in time in the rotation period, and any two adjacent rising edges in the detection signal are not always equally separated in time in the rotation period. As shown in FIG. 6, the time difference between the third rising edge and the fourth rising edge is greater than the time difference between the fourth rising edge and the fifth rising edge.

Therefore, in one embodiment, when any two adjacent rising edges in the detection signal are equally separated in time in the rotation period, the rotation direction is determined to be clockwise. When any two adjacent falling edges in the detection signal are equally separated in time in the rotation period, the rotation direction is determined to be counterclockwise.

In another embodiment, when any two adjacent falling edges in the detection signal are not always equally separated in time in the rotation period, the rotation direction is determined to be clockwise. When any two adjacent rising edges in the detection signal are not always equally separated in time in the rotation period, the rotation direction is determined to be counterclockwise. As such, in one rotation period, when the time difference between the adjacent falling edges in the detection signal are detected to be different or the time difference between the adjacent rising edges in the detection signal are detected to be different, the rotation direction may be accurately determined. It is not necessary to obtain the time differences between all adjacent falling edges or the time differences between all adjacent rising edges. Thus, the rotation direction is determined more quickly and determining the rotation direction is more efficient.

Figure 7:
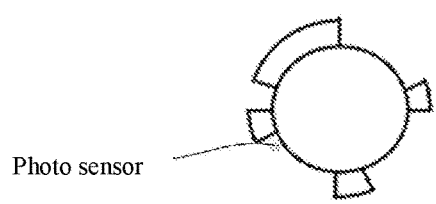
FIG. 7 is a schematic diagram of the code disc and the optoelectrical sensor according to another example embodiment of the present disclosure.
Figure 8:
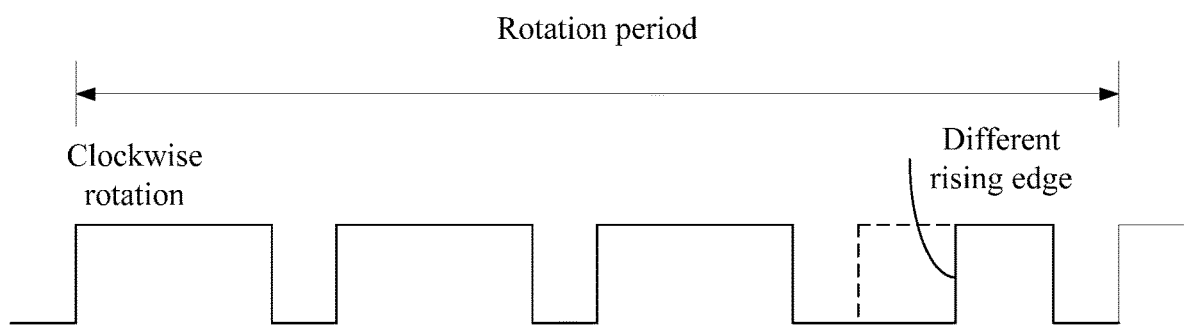
FIG. 8 is a schematic waveform diagram of the detection signal of the clockwise rotating code disc according to another example embodiment of the present disclosure.
Figure 9:
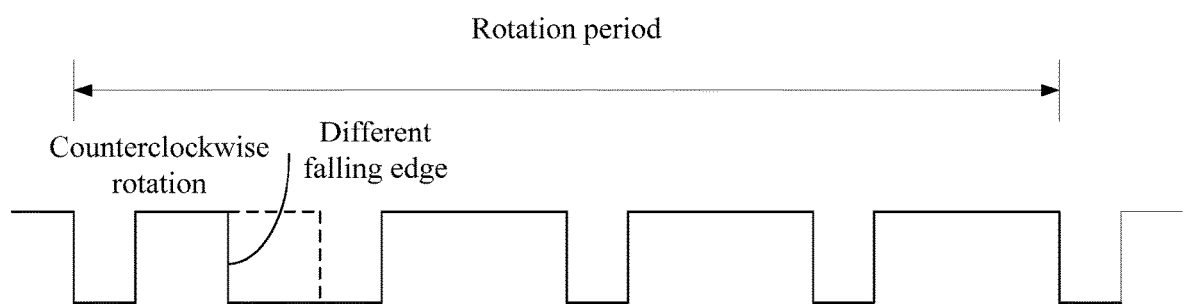
FIG. 9 is a schematic waveform diagram of the detection signal of the counterclockwise rotating code disc according to another example embodiment of the present disclosure.

If the first line segment edge is disposed in the clockwise direction of the fan tooth, for example, as shown in FIG. 7, and the detection signal is detected during the clockwise rotation, as shown in FIG. 8, any two adjacent falling edges in the detection signal are equally separated in time in the rotation period, and any two adjacent rising edges in the detection signal are not always equally separated in time in the rotation period. As shown in FIG. 8, the time difference between the third rising edge and the fourth rising edge is greater than the time difference between the fourth rising edge and the fifth rising edge. When the detection signal is detected during the counterclockwise rotation, as shown in FIG. 9, any two adjacent rising edges in the detection signal are equally separated in time in the rotation period, and any two adjacent falling edges in the detection signal are not always equally separated in time in the rotation period. As shown in FIG. 9, the time difference between the first falling edge and the second falling edge is smaller than the time difference between the second falling edge and the third falling edge.

Therefore, in one embodiment, when any two adjacent falling edges in the detection signal are equally separated in time in the rotation period, the rotation direction is determined to be clockwise. When any two adjacent rising edges in the detection signal are equally separated in time in the rotation period, the rotation direction is determined to be counterclockwise.

In another embodiment, when any two adjacent rising edges in the detection signal are not always equally separated in time in the rotation period, the rotation direction is determined to be clockwise. When any two adjacent falling edges in the detection signal are not always equally separated in time in the rotation period, the rotation direction is determined to be counterclockwise. As such, in one rotation period, when the time difference between the adjacent falling edges in the detection signal are detected to be different or the time difference between the adjacent rising edges in the detection signal are detected to be different, the rotation direction may be accurately determined. It is not necessary to obtain the time differences between all adjacent falling edges or the time differences between all adjacent rising edges. Thus, the rotation direction is determined more quickly and determining the rotation direction is more efficient.

The following describes how to obtain the rotation speed in the rotation parameter.

In one embodiment, during the rotation period of the rotating object, a duration of the detection signal is obtained. Then, based on the duration, the rotation speed is determined. In this case, the rotating object rotates one complete round. Correspondingly, the code disc also rotates one complete round. The duration of one complete round of the rotation of the code disc is obtained. Based on the duration for one complete round of the rotation, the rotation speed may be determined. For example, the rotation speed is determined to be $1/T$, where T is the duration for one complete round of the rotation.

In one embodiment, during the rotation period of the rotating object, the rotation speed is determined based on the time relationship between the rising edges in the detection signal and/or the time relationship between the falling edges in the detection signal. The rotation speed of the rotating object determines the rotation speed of the code disc and timing of the rising and falling edges in the detection signal. For example, the faster the rotation speed of the rotating object, the shorter the time difference between the rising edges and between the falling edges. The slower the rotation speed of the rotating object, the longer the time difference between the rising edges and between the falling edges. Thus, the rotation speed may be determined based on the time relationship between the rising edges in the detection signal and/or the time relationship between the falling edges in the detection signal. Two implementation solutions are illustrated below, but the present disclosure is not limited thereto.

In one embodiment, time differences between each and every two adjacent rising edges in the detection signal in the rotation period are obtained. N time differences are obtained. Based on the N time differences, an average time difference is obtained. Based on the average time difference, the rotation speed is obtained. In another embodiment, the time differences between each and every two adjacent falling edges in the detection signal in the rotation period are obtained. N time differences are obtained. Based on the N time differences, an average time difference is obtained. Based on the average time difference, the rotation speed is obtained. For example, as shown in FIG. 5, FIG. 6, FIG. 8, and FIG. 9, the average time difference obtained from the time differences between each and every two adjacent rising edges in the rotation period is the same as the average time difference obtained from the time differences between each and every two adjacent falling edges in the rotation period. Thus, regardless of the rising edges or the falling edges, the average time difference finally obtained is the same. Because the fan teeth divide the code disc into N segments, it takes the average time difference for the code disc to rotate $1/N$ of the complete round, and as such, the rotation speed may be determined. For example, the rotation speed is $1/(N*t)$, where t is the average time difference.

In another embodiment, when any two adjacent rising edges in the detection signal are equally separated in time in the rotation period, the rotation speed is determined based on the time difference between any two adjacent rising edges in the detection signal in the rotation period. As shown in FIG. 5 or FIG. 9, any two adjacent rising edges in the detection signal are equally separated in time in the rotation period, and the time difference between any two rising edges is equal to the rotation period divided by N. Thus, the rotation speed may be quickly determined based on the time difference between any two adjacent rising edges. It is not necessary to wait for one rotation period. Thus, the rotation speed is determined more quickly and determining the rotation speed is more efficient.

In another embodiment, when any two adjacent falling edges in the detection signal are equally separated in time in the rotation period, the rotation speed is determined based on the time difference between any two adjacent falling edges in the detection signal in the rotation period. As shown in FIG. 6 or FIG. 8, any two adjacent falling edges in the detection signal are equally separated in time in the rotation period, and the time difference between any two falling edges is equal to the rotation period divided by N. Thus, the rotation speed may be quickly determined based on the time difference between any two adjacent falling edges. It is not necessary to wait for one rotation period. Thus, the rotation speed is determined more quickly and determining the rotation speed is more efficient.

The following describes how to obtain the mechanical zero position in the rotation parameter.

In some embodiments, during the rotation period of the rotating object, a mechanical zero position is obtained based on the rising edges and/or the falling edges in the detection signal. As shown in FIG. 5 and FIG. 6, the detection signal generated during the clockwise rotation of the rotating object includes one rising edge different from the other rising edges in the rotation period and the detection signal generated during the counterclockwise rotation of the rotating object includes one falling edge different from the other falling edges in the rotation period. Thus, the rotation direction may be determined based on the rising edges and/or the falling edges in the detection signal in the rotation period.

In one embodiment, when any two adjacent rising edges in the detection signal are not always equally separated in time in the rotation period, a reference rising edge is determined based on the time relationship between the rising edges in the detection signal in the rotation period. Then, based on the time point of the reference rising edge, the mechanical zero position is determined. The time difference between the reference rising edge and the rising edge preceding the reference rising edge is not equal to the time difference between the reference rising edge and the rising edge succeeding the reference rising edge. As shown in FIG. 6 and FIG. 8, the time difference between the third rising edge and the fourth rising edge is greater than the time difference between the fourth rising edge and the fifth rising edge. Thus, the fourth rising edge is the reference rising edge. Based on the time point of the reference rising edge, the mechanical zero position is determined. For example, the time point of the reference rising edge is determined to be the mechanical zero position. Or a time point that is a pre-set time interval away from the time point of the reference rising edge is determined to be the mechanical zero position.

In one embodiment, when any two adjacent falling edges in the detection signal are not always equally separated in time in the rotation period, a reference falling edge is determined based on the time relationship between the falling edges in the detection signal in the rotation period. Then, based on the time point of the reference falling edge, the mechanical zero position is determined. The time difference between the reference falling edge and the falling edge preceding the reference falling edge is not equal to the time difference between the reference falling edge and the falling edge succeeding the reference falling edge. As shown in FIG. 5 and FIG. 9, the time difference between the first falling edge and the second falling edge is smaller than the time difference between the second falling edge and the third falling edge. Thus, the second falling edge is the reference falling edge. Based on the time point of the reference falling edge, the mechanical zero position is determined. For example, the time point of the reference falling edge is determined to be the mechanical zero position. Or a time point that is a pre-set time interval away from the time point of the reference falling edge is determined to be the mechanical zero position.

In the embodiments of the present disclosure, the rotation direction, the rotation speed, and the mechanical zero position may be obtained through one detection signal. Compared with the existing technology that needs three detection signals, the number of the detection signals is reduced, the number of supporting hardware is reduced correspondingly, the failure rate is reduced, and the cost is reduced.

The present disclosure also provides a computer storage medium. The computer storage medium stores program instructions. When being executed, the program is configured to perform some or all of the processes of the rotation parameter detection method in FIG. 2 and the corresponding embodiments.

Figure 10:
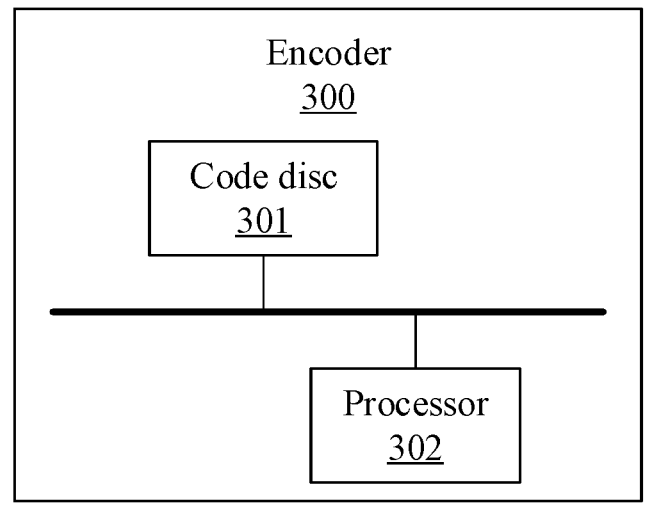
FIG. 10 is a structural block diagram of an encoder according to an example embodiment of the present disclosure.

FIG. 10 is a structural block diagram of an encoder according to an example embodiment of the present disclosure. As shown in FIG. 10, the encoder 300 includes a code disc 301 and a processor 302. The processor 302 is communicatively coupled with the code disc 301. The code disc 301 rotates with the rotation of the rotating object.

The processor 302 may be a central processing unit (CPU). The processor 302 may also be other general-purpose processor, a digital signal processor (DSP), an application specific integrated circuit (ASIC), a field-programmable gate array (FPGA) or other programmable logic device, discrete gate or transistor logic device, or discrete hardware component. The general-purpose processor may be a microprocessor or any conventional processor.

The processor 302 is configured to detect the rotation of the code disc 301 to obtain a detection signal and to obtain the rotation parameter of the rotating object based on the detection signal. The rotation parameter includes the rotation direction, the rotation speed, and the mechanical zero position.

In some embodiments, N fan teeth are disposed at the code disc 301 extending radially, where N is an integer greater than 2. Each fan tooth includes a first line segment edge and a second line segment edge. The first line segment edges of the N fan teeth are disposed at the code disc 301 at equal intervals. Each fan tooth includes an arc edge along a circumference of the code disc 301. One of the N fan teeth has the arc edge of a different length. The other N−1 fan teeth have the arc edges of a same length. The code disc 301 is illustrated in FIG. 3.

The encoder is configured to implement the technical solutions of the foregoing method embodiments. The operation principle and the technical effects are similar and will not be repeated herein.

Figure 11:
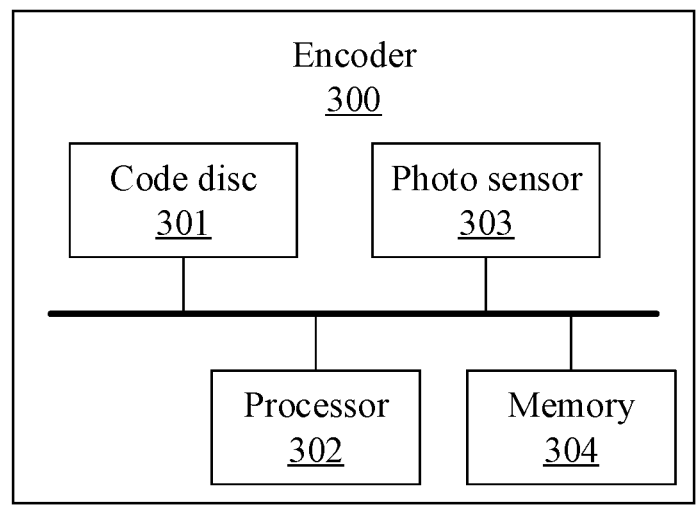
FIG. 11 is a structural block diagram of the encoder according to another example embodiment of the present disclosure.

FIG. 11 is a structural block diagram of the encoder according to another example embodiment of the present disclosure. As shown in FIG. 11, in addition to the embodiment in FIG. 10, the encoder 300 further includes a photo sensor 303. The photo sensor 303 is communicatively coupled with the processor 302.

When any of the fan teeth of the code disc 301 blocks the photo sensor 303, the detection signal is a continuous first signal. When none of the fan teeth of the code disc blocks the photo sensor, the detection signal is a continuous second signal. The first signal is different from the second signal.

In some embodiments, the first signal is a low-level signal and the second signal is a high-level signal.

In some embodiments, the detection signal is a square wave signal.

In some embodiments, the processor 302 is configured to determine the rotation direction based on the rising edges and/or the falling edges in the detection signal in the rotation period of the rotating object.

In some embodiments, the processor 302 is configured to determine the rotation direction based on the time relationship between the rising edges in the detection signal and/or the time relationship between the falling edges in the detection signal in the rotation period of the rotating object.

In some embodiments, the processor 302 is configured to perform the following.

When the first line segment edge is disposed in the clockwise direction of the fan tooth, and any two adjacent rising edges in the detection signal are equally separated in time in the rotation period, or any two adjacent falling edges in the detection signal are not always equally separated in time in the rotation period, the rotation direction is determined to be counterclockwise. When any two adjacent falling edges in the detection signal are equally separated in time in the rotation period, or any two adjacent rising edges in the detection signal are not always equally separated in time in the rotation period, the rotation direction is determined to be clockwise.

When the first line segment edge is disposed in the counterclockwise direction of the fan tooth, and any two adjacent rising edges in the detection signal are equally separated in time in the rotation period, or any two adjacent falling edges in the detection signal are not always equally separated in time in the rotation period, the rotation direction is determined to be clockwise. When any two adjacent falling edges in the detection signal are equally separated in time in the rotation period, or any two adjacent rising edges in the detection signal are not always equally separated in time in the rotation period, the rotation direction is determined to be counterclockwise.

In some embodiments, the processor 302 is configured to: obtain a duration of the detection signal during the rotation period of the rotating object, and determine the rotation speed based on the duration.

In some embodiments, the processor 302 is configured to: determine the rotation speed based on the time relationship between the rising edges in the detection signal and/or the time relationship between the falling edges in the detection signal during the rotation period of the rotating object.

In some embodiments, the processor 302 is configured to: obtain the time difference between each and every two adjacent rising edges in the detection signal in the rotation period or the time difference between each and every two adjacent falling edges in the detection signal in the rotation period, obtain the average time difference based on N time differences, and determine the rotation speed based on the average time difference.

In some embodiments, the processor 302 is configured to: determine the rotation speed based on the time difference between any two adjacent rising edges in the detection signal in the rotation period when any two adjacent rising edges in the detection signal are equally separated in time in the rotation period, or determine the rotation speed based on the time difference between any two adjacent falling edges in the detection signal in the rotation period when any two adjacent falling edges in the detection signal are equally separated in time in the rotation period.

In some embodiments, the processor 302 is configured to: determine the mechanical zero position based on the rising edges and/or the falling edges in the in the detection signal in the rotation period of the rotating object.

In some embodiments, the processor 302 is configured to: determine a reference rising edge based on the time relationship between the rising edges in the detection signal in the rotation period when any two adjacent rising edges in the detection signal are not always equally separated in time in the rotation period and determine the mechanical zero position based on the time point of the reference rising edge, where the time difference between the reference rising edge and the rising edge preceding the reference rising edge is not equal to the time difference between the reference rising edge and the rising edge succeeding the reference rising edge. Further, the processor 302 is configured to: determine a reference falling edge based on the time relationship between the falling edges in the detection signal in the rotation period when any two adjacent falling edges in the detection signal are not always equally separated in time in the rotation period and determine the mechanical zero position based on the time point of the reference falling edge, where the time difference between the reference falling edge and the falling edge preceding the reference falling edge is not equal to the time difference between the reference falling edge and the falling edge succeeding the reference falling edge.

In some embodiments, the rotating object is an electric motor.

In some embodiments, the encoder also includes a memory 304. The processor 302 is connected to the memory 304 through a bus. The memory 304 may include a read-only memory (ROM) and a random-access memory (RAM), and may provide instructions and data to the processor 302. A part of the memory 304 may also include a non-volatile random-access memory. The memory 304 is configured to store the code for implementing the rotation parameter detection method. The processor 302 is configured to invoke the code stored in the memory 304 to execute the foregoing solution.

The encoder is configured to implement the technical solutions of the foregoing method embodiments. The operation principle and the technical effects are similar and will not be repeated herein.

Figure 12:
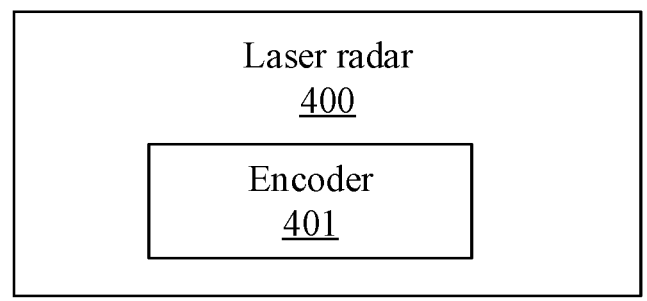
FIG. 12 is a structural block diagram of a laser radar according to an example embodiment of the present disclosure.

FIG. 12 is a structural block diagram of a laser radar according to an example embodiment of the present disclosure. As shown in FIG. 12, the laser radar 400 includes an encoder 401. The encoder 401 may be implemented by using the device shown in FIG. 10 or FIG. 11. Correspondingly, the encoder 401 is configured to implement the technical solutions of the foregoing method embodiments. The operation principle and the technical effects are similar and will not be repeated herein. It should be noted that the laser radar 400 also includes other components, which are not shown here.

Figure 13:
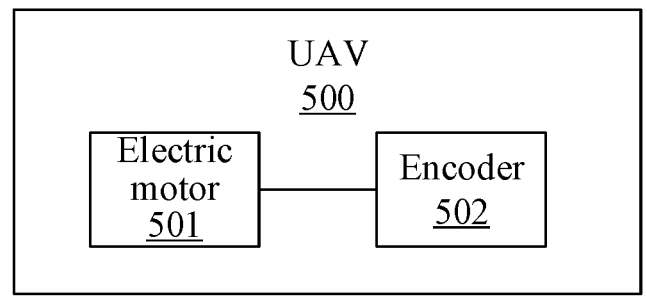
FIG. 13 is a structural block diagram of an unmanned aerial vehicle according to an example embodiment of the present disclosure.

FIG. 13 is a structural block diagram of an unmanned aerial vehicle according to an example embodiment of the present disclosure. As shown in FIG. 13, the unmanned aerial vehicle (UAV) 500 includes an electric motor 501 and an encoder 502. The encoder 502 is configured to detect the rotation parameter of the electric motor 501. The encoder 502 may be implemented by using the device shown in FIG. 10 or FIG. 11. Correspondingly, the encoder 501 is configured to implement the technical solutions of the foregoing method embodiments. The operation principle and the technical effects are similar and will not be repeated herein. It should be noted that the UAV 500 also includes other components, which are not shown here.

Those skilled in the art may understand that all or some processes of the foregoing method embodiments may be implemented by program instructions instructing related hardware. The program may be stored in a computer-readable storage medium. When being executed, the program implements the processes of the foregoing method embodiments. The storage medium includes any medium for storing the program instructions, such as a read-only memory (ROM), a random-access memory (RAM), a magnetic disk, or an optical disk.

Various embodiments of the present disclosure are merely used to illustrate the technical solution of the present disclosure, but the scope of the present disclosure is not limited thereto. Although the present disclosure has been described in detail with reference to the foregoing embodiments, those skilled in the art should understand that the technical solution described in the foregoing embodiments can still be modified or some or all technical features can be equivalently replaced. Without departing from the spirit and principles of the present disclosure, any modifications, equivalent substitutions, and improvements, etc. shall fall within the scope of the present disclosure.

What is claimed is:

1. An encoder comprising:
a code disc configured to rotate along with a rotating object and including a plurality of fan teeth extending radially, wherein:
one of the plurality of fan teeth is different from other ones of the plurality of fan teeth, the other ones of the fan teeth being same to each other; and
a first portion of a detection signal that is generated in one round of rotation of the code disc, corresponding to the one of the plurality of fan teeth, is different from a second portion of the detection signal, corresponding to each of the other ones of the fan teeth; and
a processor communicatively coupled with the code disc and configured to:
detect the rotation of the code disc to obtain the detection signal; and
obtain a rotation parameter of the rotating object based on the detection signal, the rotation parameter including at least one of a rotation direction, a rotation speed, or a mechanical zero position,
wherein, in a rotation period of the rotating object:
the rotation direction is determined based on at least one of a time relationship between rising edges in the detection signal or a time relationship between falling edges in the detection signal;
the rotation speed is determined based on a duration of the detection signal; and
the mechanical zero position is determined based on at least one of the rising edges or the falling edges in the detection signal.

2. The encoder of claim 1, further comprising a photo sensor communicatively coupled with the processor and configured to generate the detection signal, the photo sensor being disposed on a position adjacent to the code disc, wherein each of the fan teeth is configured to block the photo sensor for a period of time in the rotation period of the rotating object.

3. The encoder of claim 2, wherein in the rotation period of the rotating object, the one of the fan teeth is configured to block the photo sensor for a first period of time, and each of the other ones of the fan teeth is configured to block the photo sensor for a second period of time, the second period of time being different from the first period of time.

4. The encoder of claim 3, wherein the first period of time is greater than the second period of time.

5. The encoder of claim 2, wherein the detection signal includes:
a continuous first signal that is detected when any of the fan teeth blocks the photo sensor, and
a continuous second signal detected when none of the fan teeth blocks the photo sensor, the first signal being different from the second signal.

6. The encoder of claim 5, wherein the first signal includes a low-level signal and the second signal includes a high-level signal.

7. The encoder of claim 1, wherein:
in the rotation period of the rotating object, the detection signal includes a plurality of square wave cycles, each of the square wave cycles including a low-level period each corresponding to one fan tooth of the plurality of fan teeth and a high-level period, and
the processor is further configured to determine the rotation direction based a time relationship between the low-level periods and the high-level periods.

8. The encoder of claim 1, wherein:
each of the fan teeth includes a first line segment edge, a second line segment edge, and a first arc edge along a circumference of the code disc and connecting the first line segment edge and the second line segment edge;
the first line segment edges of the fan teeth are arranged at the code disc with equal intervals; and
a length of the arc edge of the one of the fan teeth is different from lengths of the arc edges of the other ones of the fan teeth, and the lengths of the arc edges of the other ones of the fan teeth equal each other.

9. The encoder of claim 8, wherein the processor is further configured to determine the rotation direction based on at least one of the time relationship between the rising edges in the detection signal or the time relationship between the falling edges in the detection signal.

10. The encoder of claim 9, wherein:
for each of the fan teeth, the first line segment edge is disposed in a clockwise direction with respect to the second line segment edge; and
the processor is further configured to determine the rotation direction to be counterclockwise in response to determining that:
the rising edges are equally separated in time in the rotation period, or
the falling edges are not always equally separated in time in the rotation period.

11. The encoder of claim 9, wherein:
for each of the fan teeth, the first line segment edge is disposed in a clockwise direction with respect to the second line segment edge; and
the processor is further configured to determine the rotation direction to be clockwise in response to determining that:
the falling edges are equally separated in time in the rotation period, or
the rising edges are not always equally separated in time in the rotation period.

12. The encoder of claim 9, wherein:
for each of the fan teeth, the first line segment edge is disposed in a counterclockwise direction with respect to the second line segment edge; and
the processor is further configured to determine the rotation direction to be clockwise in response to determining that:
the rising edges are equally separated in time in the rotation period, or the falling edges are not always equally separated in time in the rotation period.

13. The encoder of claim 9, wherein:
for each of the fan teeth, the first line segment edge is disposed in a counterclockwise direction with respect to the second line segment edge; and
the processor is further configured to determine the rotation direction to be counterclockwise in response to determining that:
the falling edges are equally separated in time in the rotation period, or
the rising edges are not always equally separated in time in the rotation period.

14. The encoder of claim 1, wherein the processor is further configured to determine the rotation speed based on at least one of a time relationship between the rising edges in the detection signal or a time relationship between the falling edges in the detection signal in the rotation period of the rotating object.

15. The encoder of claim 14, wherein the processor is further configured to:
obtain time differences, each of the time differences being between two adjacent ones of the rising edges or between two adjacent ones of the falling edges;
obtain an average time difference based on the time differences; and
determine the rotation speed based on the average time difference.

16. The encoder of claim 14, wherein the processor is further configured to determine the rotation speed based on:
a time difference between any two adjacent ones of the rising edges in response to the rising edges being equally separated in time in the rotation period; or
a time difference between any two adjacent ones of the falling edges in response to the falling edges being equally separated in time in the rotation period.

17. The encoder of claim 1, wherein the processor is further configured to determine the mechanical zero position based on the at least one of the rising edges or the falling edges in the detection signal in the rotation period of the rotating object.

18. The encoder of claim 17, wherein the processor is further configured to, in response to the rising edges not always being equally separated in time in the rotation period:
determine a reference rising edge based on a time relationship between the rising edges in the rotation period; and
determine the mechanical zero position based on a time point of the reference rising edge, a time difference between the reference rising edge and the rising edge preceding the reference rising edge being not equal to a time difference between the reference rising edge and the rising edge succeeding the reference rising edge.

19. The encoder of claim 17, wherein the processor is further configured to, in response to the falling edges not always being equally separated in time in the rotation period:
determine a reference falling edge based on a time relationship between the falling edges in the rotation period; and
determine the mechanical zero position based on a time point of the reference falling edge, a time difference between the reference falling edge and the falling edge preceding the reference falling edge being not equal to a time difference between the reference falling edge and the falling edge succeeding the reference falling edge.

20. A laser radar comprising an encoder that includes:
a code disc configured to rotate along with a rotating object and including a plurality of fan teeth extending radially, wherein:
one of the plurality of fan teeth is different from other ones of the plurality of fan teeth, the other ones of the fan teeth being same to each other; and
a first portion of a detection signal that is generated in one round of rotation of the code disc, corresponding to the one of the plurality of fan teeth, is different from a second portion of the detection signal, corresponding to each of the other ones of the fan teeth; and
a processor communicatively coupled with the code disc and configured to:
detect the rotation of the code disc to obtain the detection signal; and
obtain a rotation parameter of the rotating object based on the detection signal, the rotation parameter including at least one of a rotation direction, a rotation speed, or a mechanical zero position,
wherein, in a rotation period of the rotating object:
the rotation direction is determined based on at least one of a time relationship between rising edges in the detection signal or a time relationship between falling edges in the detection signal;
the rotation speed is determined based on a duration of the detection signal; and
the mechanical zero position is determined based on at least one of the rising edges or the falling edges in the detection signal.

* * * * *